(12) United States Patent
Matsumoto et al.

(10) Patent No.: US 9,837,691 B2
(45) Date of Patent: Dec. 5, 2017

(54) BATTERY MODULE

(71) Applicant: Hitachi, Ltd., Chiyoda-ku, Tokyo (JP)

(72) Inventors: Shigenori Matsumoto, Tokyo (JP); Yasutaka Ookura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 40 days.

(21) Appl. No.: 14/908,309

(22) PCT Filed: Aug. 7, 2013

(86) PCT No.: PCT/JP2013/071307
§ 371 (c)(1),
(2) Date: Jan. 28, 2016

(87) PCT Pub. No.: WO2015/019429
PCT Pub. Date: Feb. 12, 2015

(65) Prior Publication Data
US 2016/0197385 A1 Jul. 7, 2016

(51) Int. Cl.
*H01M 10/613* (2014.01)
*H01M 10/617* (2014.01)
*H01G 2/08* (2006.01)
*H01M 2/10* (2006.01)
*H01M 10/6551* (2014.01)
(Continued)

(52) U.S. Cl.
CPC ............ *H01M 10/617* (2015.04); *H01G 2/08* (2013.01); *H01M 2/1077* (2013.01);
(Continued)

(58) Field of Classification Search
CPC .......................... H01M 2/1077; H01M 10/613
See application file for complete search history.

(56) References Cited

U.S. PATENT DOCUMENTS

| 2005/0123828 A1* | 6/2005 | Oogami | H01M 2/206 |
| | | | 429/152 |
| 2013/0120910 A1 | 5/2013 | Watanabe | |

FOREIGN PATENT DOCUMENTS

| EP | 2 405 528 A1 | 1/2012 |
| JP | 2009-252553 A | 10/2009 |

(Continued)

OTHER PUBLICATIONS

Extended European Search Report issued in counterpart European Application No. 13890979.1 dated Jan. 13, 2017 (Nine (9) pages).
(Continued)

*Primary Examiner* — Olatunji Godo
(74) *Attorney, Agent, or Firm* — Crowell & Moring LLP

(57) ABSTRACT

Provided is a battery module of which temperature can be homogenized regardless of the material. This battery module includes: a first heat dissipation plate and a second heat dissipation plate; a laminated type battery group disposed between the first heat dissipation plate and the second heat dissipation plate and formed by stacking two or more laminated type batteries; and a case housing the laminated type battery group, and the first heat dissipation plate and the second heat dissipation plate, wherein: a third heat dissipation plate is disposed between the two laminated type batteries among the laminated type battery group; each of the first heat dissipation plate, the second heat dissipation plate, and the third heat dissipation plate includes a contact portion in contact with the case, and a flat portion in contact with and opposite to the laminated type battery; and the flat portion of the first heat dissipation plate and the flat portion of the second heat dissipation plate are provided with a plurality of holes.

5 Claims, 14 Drawing Sheets

(51) Int. Cl.
  *H01M 10/6554* (2014.01)
  *H01M 10/0525* (2010.01)
  *H01M 10/0585* (2010.01)
  *H01M 10/652* (2014.01)
  *H01M 10/6555* (2014.01)
  *H01G 11/18* (2013.01)
  *H01G 11/12* (2013.01)

(52) U.S. Cl.
  CPC ... *H01M 10/0525* (2013.01); *H01M 10/0585* (2013.01); *H01M 10/652* (2015.04); *H01M 10/6551* (2015.04); *H01M 10/6554* (2015.04); *H01M 10/6555* (2015.04); *H01G 11/12* (2013.01); *H01G 11/18* (2013.01); *H01M 2220/20* (2013.01)

(56) References Cited

FOREIGN PATENT DOCUMENTS

| | | |
|---|---|---|
| JP | 2012-160542 A | 8/2012 |
| JP | 2012-160543 A | 8/2012 |
| JP | 2012-204129 A | 10/2012 |
| JP | 2010-272378 A | 12/2012 |
| WO | WO 2012/015068 A1 | 2/2012 |

OTHER PUBLICATIONS

International Search Report (PCT/ISA/210) issued in PCT Application No. PCT/JP2013/071307 dated Oct. 8, 2013, with English translation (four (4) pages).

\* cited by examiner

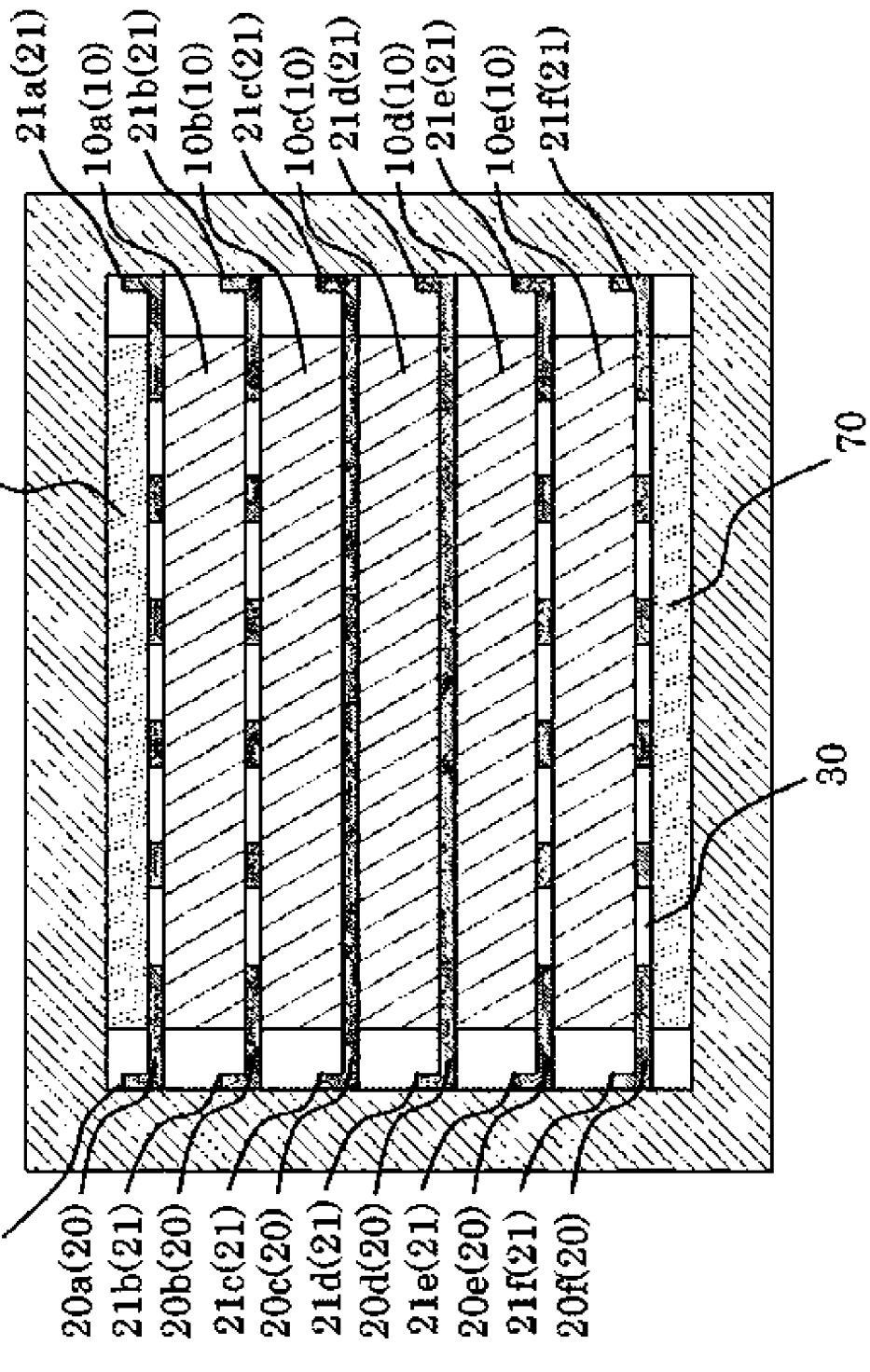

SECTIONAL VIEW C-C

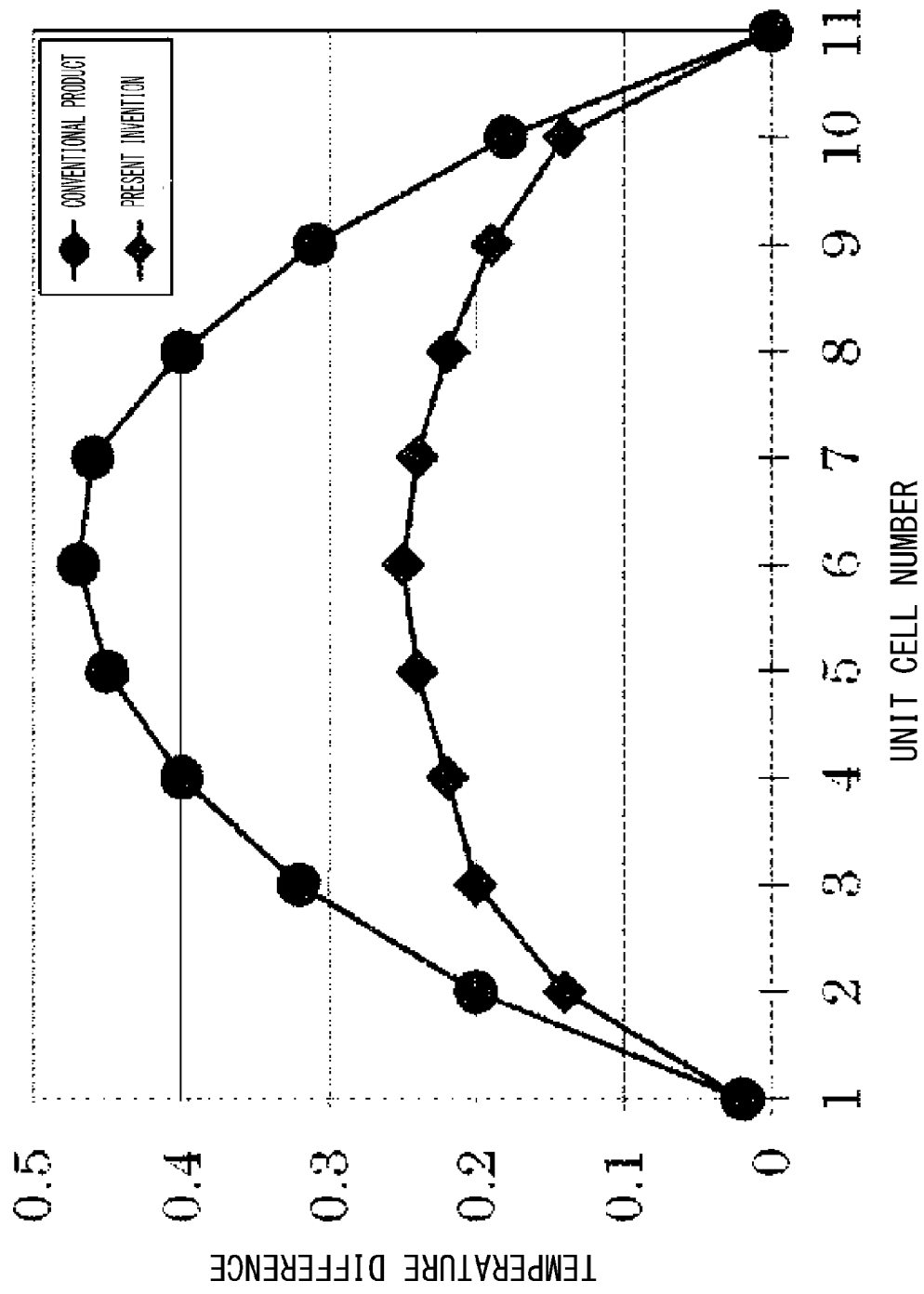

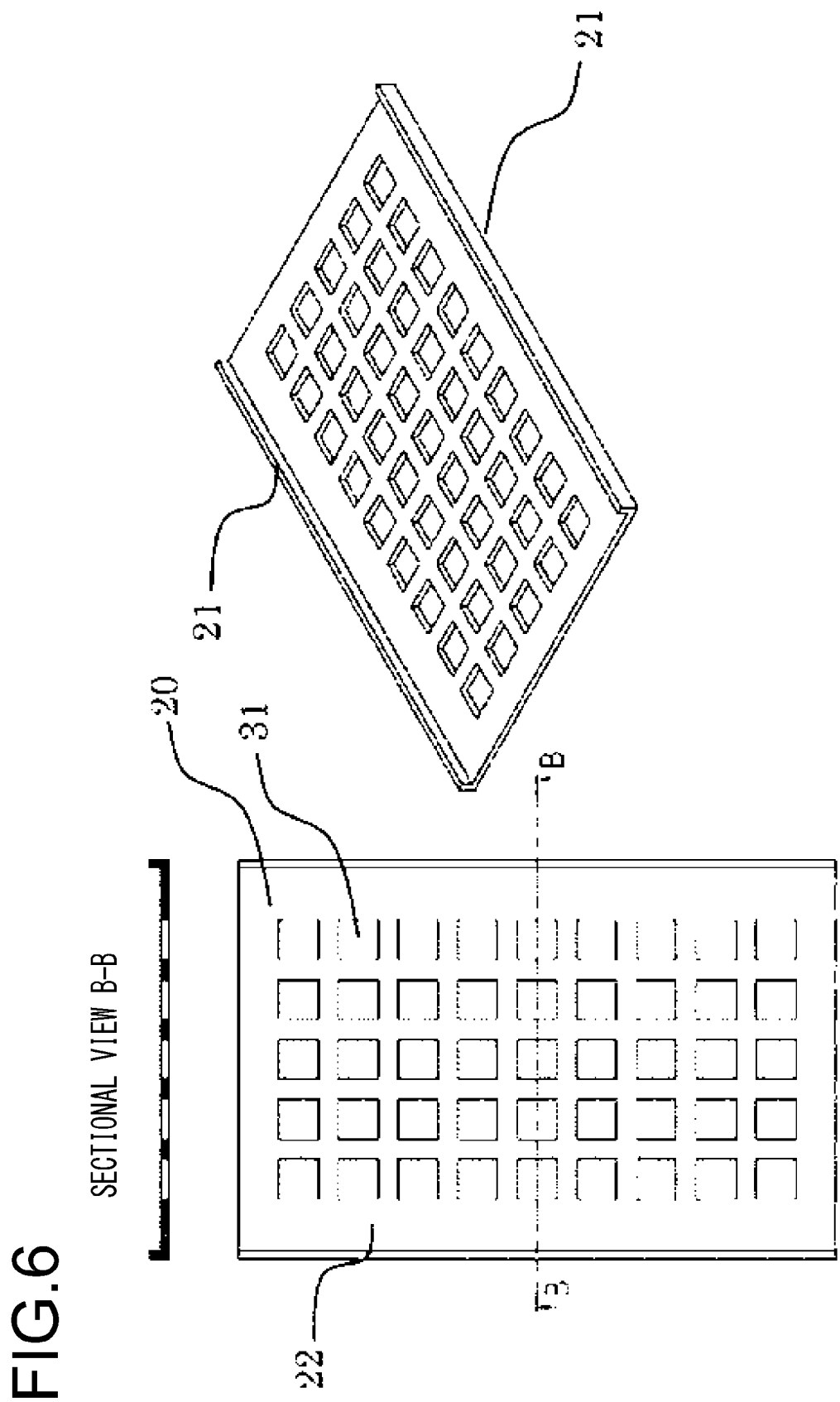

FIG.8 SECTIONAL VIEW B-B

BATTERY MODULE

TECHNICAL FIELD

The present invention relates to a battery module formed by stacking and unifying a plurality of unit cells.

BACKGROUND ART

As the on-vehicle batteries, secondary batteries have been widely known in which an electrode group is housed in a metal or resin container filled with an electrolyte solution. The electrode group includes a positive electrode sheet and a negative electrode sheet which are partitioned by a separator.

Typically, lithium ion secondary batteries have been known. The lithium ion secondary batteries include a wound type battery having a separator held between one positive electrode sheet and one negative electrode sheet, and a laminated type battery having positive electrode sheets and negative electrode sheets stacked on each other with a sheet-shaped separator held therebetween.

In particular, the laminated type battery has higher heat dissipation property than the wound type battery. In view of this, examinations have been conducted on the battery module formed by stacking a plurality of laminated type batteries that has smaller size and higher energy density and satisfies the requirements of higher capacity and higher output.

On the other hand, it has been known that the lithium ion secondary battery generates heat in the charging and discharging, and the battery performance thereof will change as the internal temperature changes. Therefore, in the battery module formed by stacking the plural laminated type batteries, the temperature varies in the unit cells in the center and on the outside in the stacking direction of the laminated type batteries. If the temperature variation is increased, the deterioration in the laminated type battery with higher temperature is promoted, resulting in the shorter lifetime of that laminated type battery. In view of this, in order to homogenize the burden on the batteries and facilitate the control, homogenizing the temperature has been a subject.

For this subject, PTL 1 has disclosed the technique for homogenizing the temperature of the laminated type batteries. According to PTL 1, the power storage cell having the exterior body housing the positive electrode, the negative electrode, and the electrolyte solution, and the heat dissipation plate formed on the outer surface of the exterior body are provided, wherein three or more layers of the power storage cells and the heat dissipation plates are alternately stacked and the thermal conductivity of the heat dissipation plate on the outside is smaller than that on the inside, so that the temperature difference between the power storage cells is reduced.

CITATION LIST

Patent Literature

PTL 1: JP 2012-160543 A

SUMMARY OF INVENTION

Technical Problem

In the invention according to PTL 1, the heat dissipation plate disposed in the center has higher thermal conductivity than that disposed on the outside. This can effectively cool the battery module if the temperature of the plural power storage cells is increased toward the center. As the number of power storage cells is increased, however, the temperature difference on the inside and the outside is increased and a plurality of materials with different thermal conductivity is necessary for the effective cooling. The thermal conductivity depends on the material and the material with high thermal conductivity costs high.

An objective of the present invention made in view of the above is to provide a battery module in which temperature can be homogenized regardless of the material.

Solution to Problem

A battery module according to the present invention includes: a first heat dissipation plate and a second heat dissipation plate; a laminated type battery group disposed between the first heat dissipation plate and the second heat dissipation plate and formed by stacking two or more laminated type batteries; and a case housing the laminated type battery group, and the first heat dissipation plate and the second heat dissipation plate, wherein: a third heat dissipation plate is disposed between the two laminated type batteries among the laminated type battery group; each of the first heat dissipation plate, the second heat dissipation plate, and the third heat dissipation plate includes a contact portion in contact with the case, and a flat portion in contact with and opposite to the laminated type battery; and the flat portion of the first heat dissipation plate and the flat portion of the second heat dissipation plate are provided with a plurality of holes.

Advantageous Effects of Invention

According to the present invention, a battery module of which temperature can be homogenized regardless of the material can be provided.

BRIEF DESCRIPTION OF DRAWINGS

FIG. 2 is a sectional view of a case used in the battery module according to the first embodiment.

FIG. 5 illustrates results of analyzing the conduction heat of the battery module according to the first embodiment.

FIG. 6 is a perspective view and a sectional view illustrating a heat dissipation plate with rectangular holes according to the first embodiment.

DESCRIPTION OF EMBODIMENTS (First Embodiment)

With reference to drawings, description is hereinafter made of an embodiment in which the present invention is applied to a battery module of an on-vehicle secondary battery.

Figure 1:
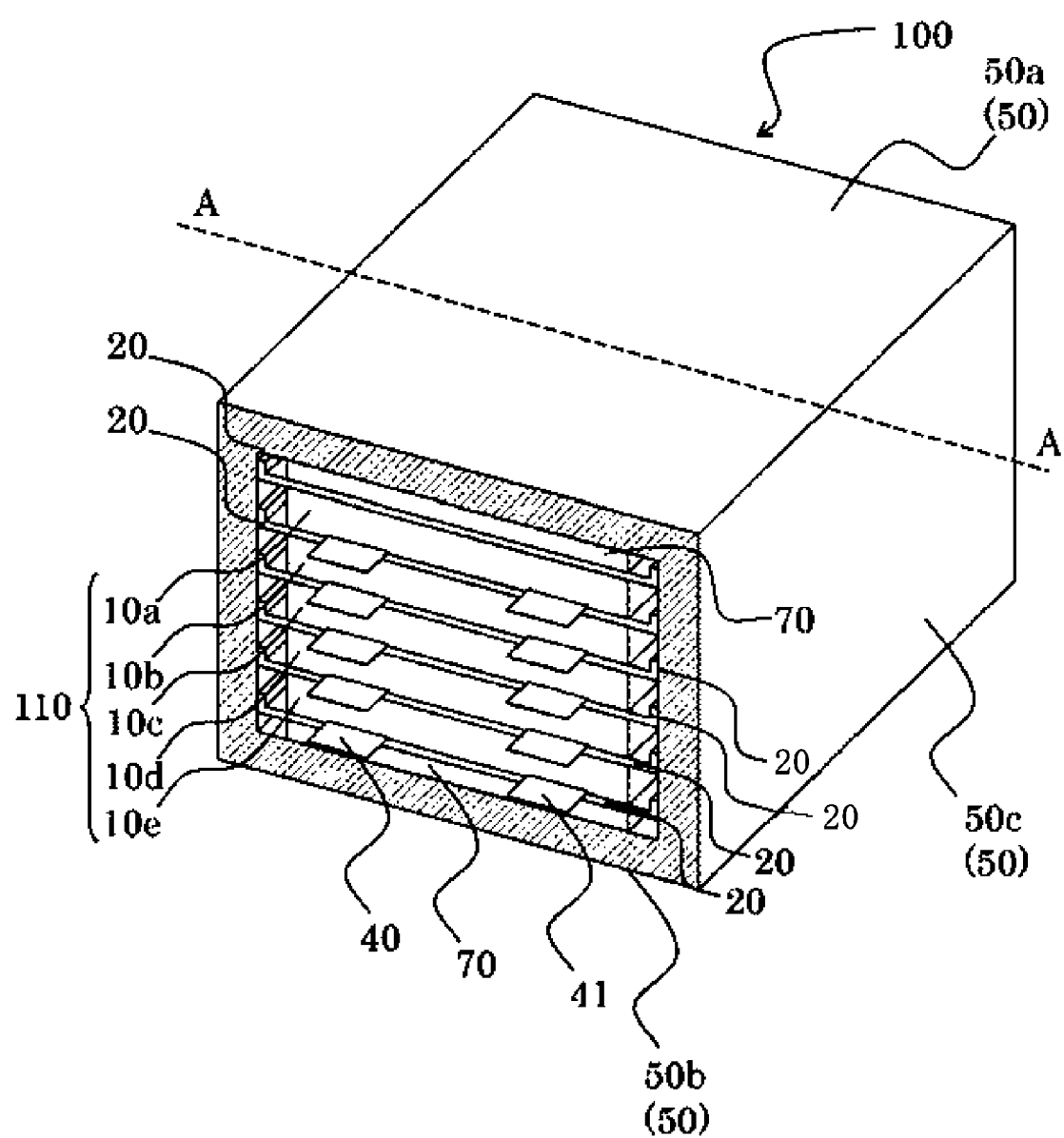
FIG. 1 is a perspective view illustrating a part of a battery module according to a first embodiment in which the present invention is applicable.

FIG. 1 is a perspective view schematically illustrating a battery module 100 according to this embodiment.

The battery module 100 according to the embodiment includes a plurality of flat laminated type batteries 10 and heat dissipation plates 20 each provided on an outer surface of the laminated type battery 10. The laminated type batteries 10 and the heat dissipation plates 20 are alternately stacked and housed in a case 50.

At each end in the stacking direction of a laminated type battery group 110 having the laminated type batteries 10 stacked, i.e., between the laminated type battery group 110 and a top surface 50a of the case and between the laminated type battery group 110 and a bottom surface 50b of the case is provided with a heat insulating plate 70. That is to say, the heat insulating plate 70 is in contact with the case 50. The heat insulating plate 70 may be omitted. However, the provision of the heat insulating plate 70 can homogenize the amount of heat conducted from each laminated type battery 10 to the case 50 and suppress the temperature variation.

If the heat insulating plates 70 are omitted, the laminated type battery group 110 is held by the top surface 50a of the case and the bottom surface 50b of the case. If the heat insulating plates 70 are provided, the laminated type battery group 110 is held by the top surface 50a of the case and the bottom surface 50b of the case through the heat insulating plates 70. Therefore, the laminated type battery group 110 is in thermal contact with the top surface 50a of the case and the bottom surface 50b of the case.

Each of the laminated type batteries 10 is provided with a positive electrode terminal 40 and a negative electrode terminal 41. As illustrated in FIG. 1, the positive electrode terminals 40 and the negative electrode terminals 41 project in a direction orthogonal to the stacking direction of the laminated type batteries 10, and the projecting direction of the electrode terminals is the same in the laminated type batteries.

The heat generated from the laminated type batteries 10 is conducted through the heat dissipation plates 20 and the heat insulating plates 70, and released out of the battery module 100 through the case 50.

FIG. 2 is a sectional view along A-A of the battery module 100 illustrated in FIG. 1. As described above, the plural laminated type batteries 10 are stacked and housed in the case 50 as the laminated type battery group 110. In this embodiment, five laminated type batteries 10 (10a, 10b, 10c, 10d, and 10e) are used but the present invention can be applied no matter how many batteries are stacked.

In this embodiment, the heat dissipation plates 20 (20a, 20b, 20c, 20d, 20e, and 20f) are disposed on the both surfaces of each of the laminated type batteries 10 (10a, 10b, 10c, 10d, and 10e). The heat dissipation plate 20 has a contact portion 21 with a folded end on each side, and a flat portion 22. The contact portion 21 is in close contact with a side surface 50c of the case, and the flat portion 22 is in close contact with a wide surface 43 of the laminated type battery 10. With this structure, the heat generated from the laminated type battery 10 in the charging and discharging is conducted to the case 50 and the unit cells 10 are thus cooled. Detailed description is hereinafter made of the elements.

<<Laminated Type Battery 10>>

Figure 4A:
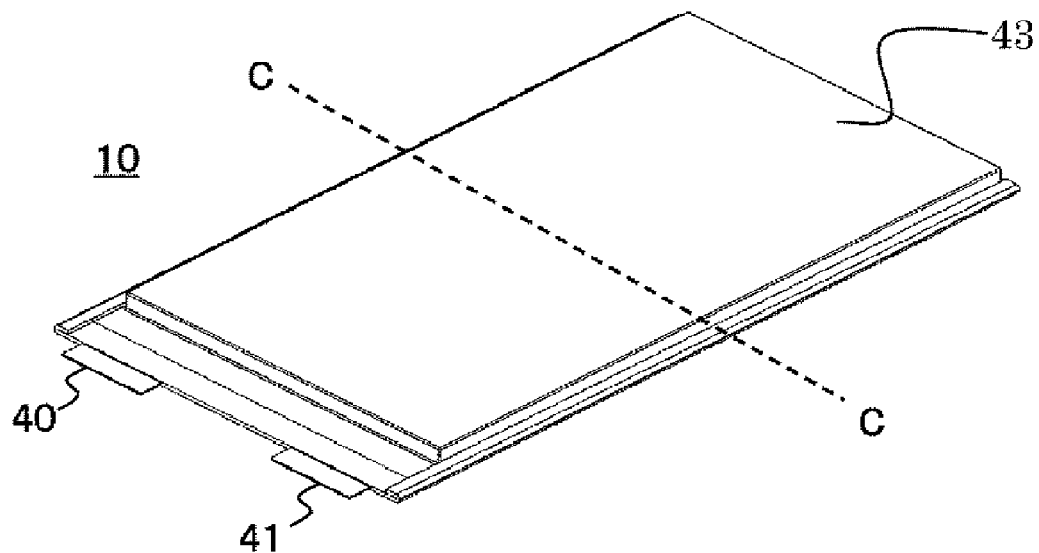
FIGS. 4A and 4B illustrate a specific structure of a laminated type battery 10 according to the first embodiment.
Figure 4B:
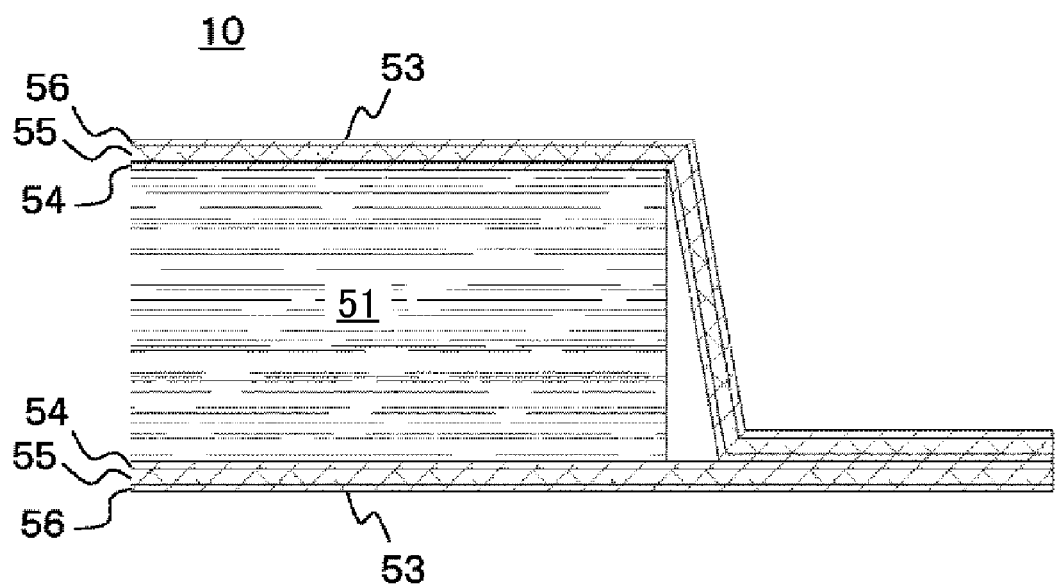

Description is made of the structure of the laminated type battery 10 with reference to FIG. 4(a) and FIG. 4(b). FIG. 4(a) is a perspective view illustrating an external appearance of the laminated type battery 10. The laminated type battery 10 has the wide surface 43, and the positive electrode terminal 40 and the negative electrode terminal 41 projecting in a direction parallel to the wide surface 43. The wide surface 43 of the laminated type battery 10 is a surface in contact with the heat dissipation plate 20 as illustrated in FIG. 2, and the amount of flowing heat changes depending on the size of the contact area between the wide surface 43 of the laminated type battery 10 and the heat dissipation plate 20.

FIG. 4(b) is a sectional view along C-C of FIG. 4(a). An exterior body 53 includes a laminated type film with a thermal bonding resin layer 54 on an inner surface of the laminated type battery 10.

The exterior body 53 (laminated type film) is formed by stacking, in the order from the outside of the battery, an exterior resin layer 56, a metal layer 55, and the thermal bonding resin layer 54. The exterior body 53 is vertically folded into two at the side opposite to the side included in the positive electrode terminal 40 and the negative electrode terminal 41 of the battery, and the thermal bonding resin layer 54 on the upper side and the thermal bonding resin layer 54 on the lower side are unified through heat sealing around a multilayer electrode portion 51. Thus, the exterior body 53 is sealed. The exterior resin layer 56 is made of polyester (PE), and has a thickness of 50 μm. The metal layer 35 is made of aluminum alloy, and has a thickness of 100 μm. The thermal bonding resin layer 54 is made of a modified polyolefin film and has a thickness of 50 μm.

A part of the heat-sealed portion is provided with a vent portion, which is not shown, processed to have lower strength than the other portion. Under the abnormal pressure increase inside the battery, the vent portion is broken earlier than the other portion so that the internal pressure is released.

Inside the exterior body 53, the multilayer electrode body 51 is incorporated. In the multilayer electrode body 51, a plurality of sheet-shaped positive electrodes and a plurality of sheet-shaped negative electrodes are stacked with a separator interposed therebetween. The inside of the exterior body 53 is impregnated with the electrolyte solution. The multilayer body including the plurality of sheet-shaped positive electrodes and the plurality of sheet-shaped negative electrodes and the separators forms the multilayer electrode body 51.

In the sheet-shaped positive electrode, a layer (positive electrode mixture layer) including a positive electrode mixture including a positive electrode active material, a conductive auxiliary agent mainly containing a carbon material, a binder, and the like is formed on a surface of a positive electrode current collector.

As the positive electrode current collector, a 0.015-mm-thick aluminum alloy foil is used.

The positive electrode mixture layer is a mixture including LiCoO2 as the positive electrode active material, acetylene black as the conductive auxiliary agent, PVDF as the binder, and the like, and is formed to have a thickness in the range of 30 to 100 µm on each surface.

As the positive electrode terminal 40, 0.2-mm-thick aluminum alloy is used.

In the sheet-shaped negative electrode, a layer (negative electrode mixture layer) including a negative electrode mixture including a negative electrode active material, a conductive auxiliary agent, a binder, and the like is formed on a surface of a negative electrode current collector.

As the negative electrode current collector, 0.01-mm-thick copper alloy is used.

The negative electrode mixture layer includes graphite as the negative electrode active material, styrene butadiene rubber (SBR) or carboxymethyl cellulose (CMC) or the like as the binder, and the like, and is formed to have a thickness in the range of 30 to 100 µm on each surface.

As the negative electrode terminal 41, 0.15-mm-thick copper alloy with a surface thereof plated with nickel is used.

The separator is polyolefin microporous film thickness of which is 25 µm and porosity ranges from 30% to 70%.

The electrolyte solution is a solution (nonaqueous electrolyte solution) formed by dissolving the solute such as LiPF6 in an organic solvent mainly containing ethylene carbonate (EC).

<<Heat-Insulating Plate 70>>

The heat insulating plate 70 illustrated in FIG. 1 is rectangular in shape, and is in contact with the case 50. The material of the heat insulating plate 70 is a foamed resin material. The heat insulating plate 70 prevents the excessive heat from being released from the top surface 50a of the case and the bottom surface 50b of the case facing the laminated type battery 10. Thus, the dominant heat dissipation route of the laminated type batteries 10a and 10e disposed at the top surface 50a and the bottom surface 50b of the case of the battery module 100 is the heat dissipation route where the heat is conducted from the heat dissipation plate 20 to the case.

When the heat insulating plate 70 is disposed between the laminated type battery 10 and the case 50 in this manner, the temperature variation between the laminated type battery 10c disposed at the center of the battery module 100 and the laminated type batteries 10a and 10e disposed on the case side in the battery module 100 can be reduced.

<<Case 50>>

As illustrated in FIG. 1, the case 50 includes the top surface 50a, the bottom surface 50b opposite to the top surface, and the side surface 50c. The material of the case 50 is an aluminum alloy in consideration of the lightness and the heat dissipation property. Specific material thereof is an A6000 (magnesium-silicon) aluminum alloy.

In this embodiment, the top surface 50a, the bottom surface 50b, and the side surface 50c are unified but may be separated alternatively.

<<Heat Dissipation Plate 20>>

Figure 3A:
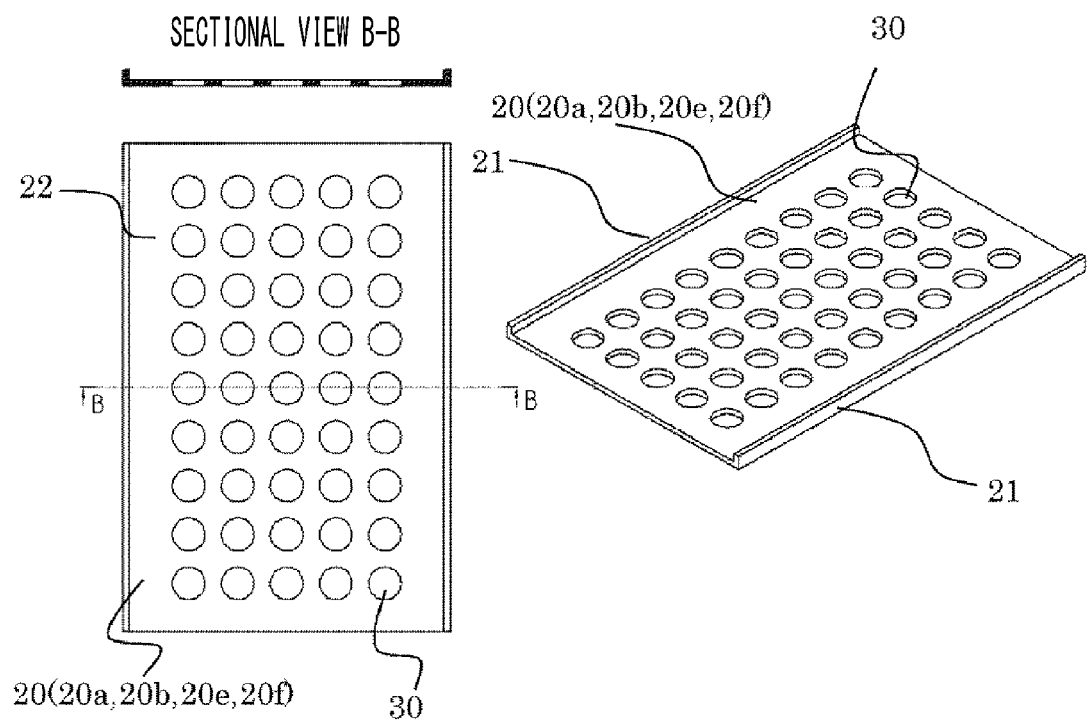
FIGS. 3A and 3B are a perspective view and a sectional view illustrating a heat dissipation plate used in the battery module according to the first embodiment.
Figure 3B:
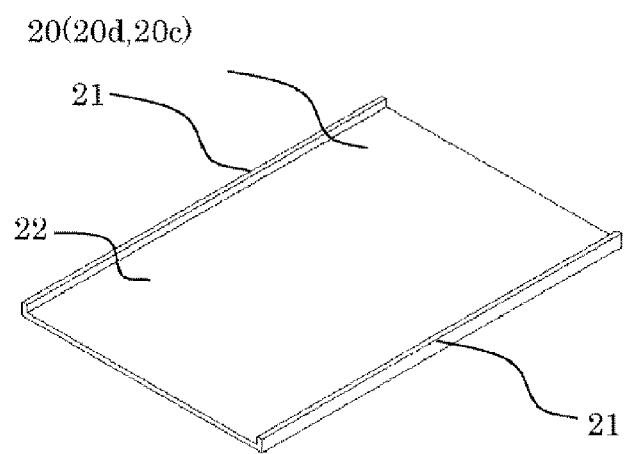

The heat dissipation plate 20 according to the embodiment is illustrated in FIG. 3(a) and FIG. 3(b). FIG. 3(a) specifically illustrates the heat dissipation plates 20a, 20b, 20e, and 20f disposed near the case 50 in the battery module 100 illustrated in FIG. 2.

Among the plurality of laminated type batteries 10 stacked, the laminated type battery 10 disposed closer to the top surface 50a and the bottom surface 50b of the case has higher heat dissipation property. Therefore, when the laminated type battery 10 generates the heat in the charging or discharging, the laminated type batteries 10b, 10c, and 10d disposed on the inside in the stacking direction have higher temperature than the laminated type batteries 10a and 10e disposed at the end in the stacking direction.

For suppressing the temperature variation among the laminated type batteries 10 in the battery module 100, regarding the heat dissipation plates 20a, 20b, 20e and 20f disposed outside, it is necessary to suppress the amount of heat flowing to the case 50 from the laminated type batteries 10a and 10e disposed near the top surface 50a and the bottom surface 50b of the case as compared to the amount of heat flowing to the case 50 from the laminated type batteries 10b, 10c, and 10d disposed in the center in the stacking direction in the laminated type battery group 110.

In view of this, in this embodiment, as illustrated in FIG. 2 and FIG. 3(a), each of the heat dissipation plates 20a, 20b, 20e, and 20f in contact with the laminated type batteries 10a and 10e disposed near the side surface of the case 50 has a mesh structure with holes 30. This increases the heat resistance in the route from the laminated type batteries 10a and 10e to the case 50 through the heat dissipation plates.

As the hole 30 is larger, the contact area between the laminated type battery 10 and the heat dissipation plate 20 is reduced. As a result, the amount of heat flowing from the laminated type battery 10 to the case 50 through the heat dissipation plate 20 is reduced. Therefore, the area of the hole 30 is enlarged if the number of laminated type batteries 10 is increased so that the temperature difference between the center and the end is increased, and the area of the hole 30 is narrowed if the number of laminated type batteries 10 is decreased so that the temperature difference is small. This can ensure the temperature homogeneity regardless of the number of stacked batteries.

On the other hand, as illustrated in FIG. 3(b), the heat dissipation plates 20c and 20d disposed in the center of the case 50 have a single plate structure without the holes 30, i.e., the structure that maximizes the amount of flowing heat. Therefore, the heat resistance in the route to the case 50 from the laminated type batteries 10b, 10c, and 10d in contact with the heat dissipation plates 20c and 20d is smaller than that in the route from the laminated type batteries 10a and 10e to the case 50 through the heat dissipation plates. Accordingly, the temperature variation in the battery module 100 is suppressed.

In this embodiment, both sides of the laminated type battery 10c disposed in the center in the stacking direction of the laminated type battery group 110 are provided with the heat dissipation plates 20c and 20d without the holes 30. One side of the laminated type battery 10b adjacent to the laminated type battery 10c is provided with the heat dissipation plate 20c and the other side thereof is provided with the heat dissipation plate 20b with the holes 30. Both sides of the laminated type battery 10a adjacent to the laminated type battery 10b are provided with the heat dissipation plates 20a and 20b with the holes 30. Therefore, the heat resistance is gradually increased from the laminated type battery 10c on the central side, where the heat is uneasily conducted, to the laminated type battery 10a near the case 50. As a result, the heat dissipation property in the case of the heat conduction to the case 50 through the heat dissipation plate follows the order: laminated type battery 10c>laminated type battery 10b>laminated type battery 10a. In this manner, the temperature difference can be suppressed between the laminated type battery 10c in the center where the temperature easily increases and the laminated type battery 10a near the case 50 where the temperature easily decreases.

With the aforementioned structure, the amount of flowing heat from the heat dissipation plates 20 to the case 50 can be suppressed at the end in the stacking direction even if the heat dissipation plates 20a, 20b, 20c, 20d, 20e, and 20f are formed of the same material. This is because the contact area between the laminated type batteries 10 (10a and 10e) disposed near the end in the stacking direction (near the case 50) and the heat dissipation plates 20 (20a, 20b, 20e, and 20f) is reduced.

Further, the mesh structure with the holes 30 enables the cost reduction because the material with the high thermal conduction is not necessary and the structure merely requires the processing of the heat dissipation plate 20.

Furthermore, the provision of the hole for the heat dissipation plate 20 can reduce the amount of metal used in the battery module 100, in which case the entire weight of the battery module 100 can be reduced.

In the processing of the heat dissipation plate 20, the mesh roughness is adjusted, thereby adjusting the amount of flowing heat freely. Thus, the necessary cooling performance can be achieved without changing the material.

As a method for reducing the temperature variation without changing the material, a method is given in which the heat capacity is changed by changing the thickness of the heat dissipation plate 20. In the method involving the change of the thickness of the heat dissipation plate 20, however, the weight and volume will increase because the heat dissipation plate 20 needs to be thickened toward the center in the stacking direction. Therefore, this method is not very preferable from the viewpoint of increasing the volume energy density and reducing the weight.

On the other hand, when the heat dissipation plates 20a, 20b, 20e, and 20f with the mesh structure having the holes 30 as disclosed in the present invention are employed, the amount of heat flowing from the laminated type batteries 10 to the case 50 can be changed merely by changing the mesh roughness. Therefore, the number of layers to be stacked can be increased without increasing the volume or weight excessively. As a result, the battery module 100 with higher output, higher capacity, smaller weight, and smaller size can be provided.

Figure 7:
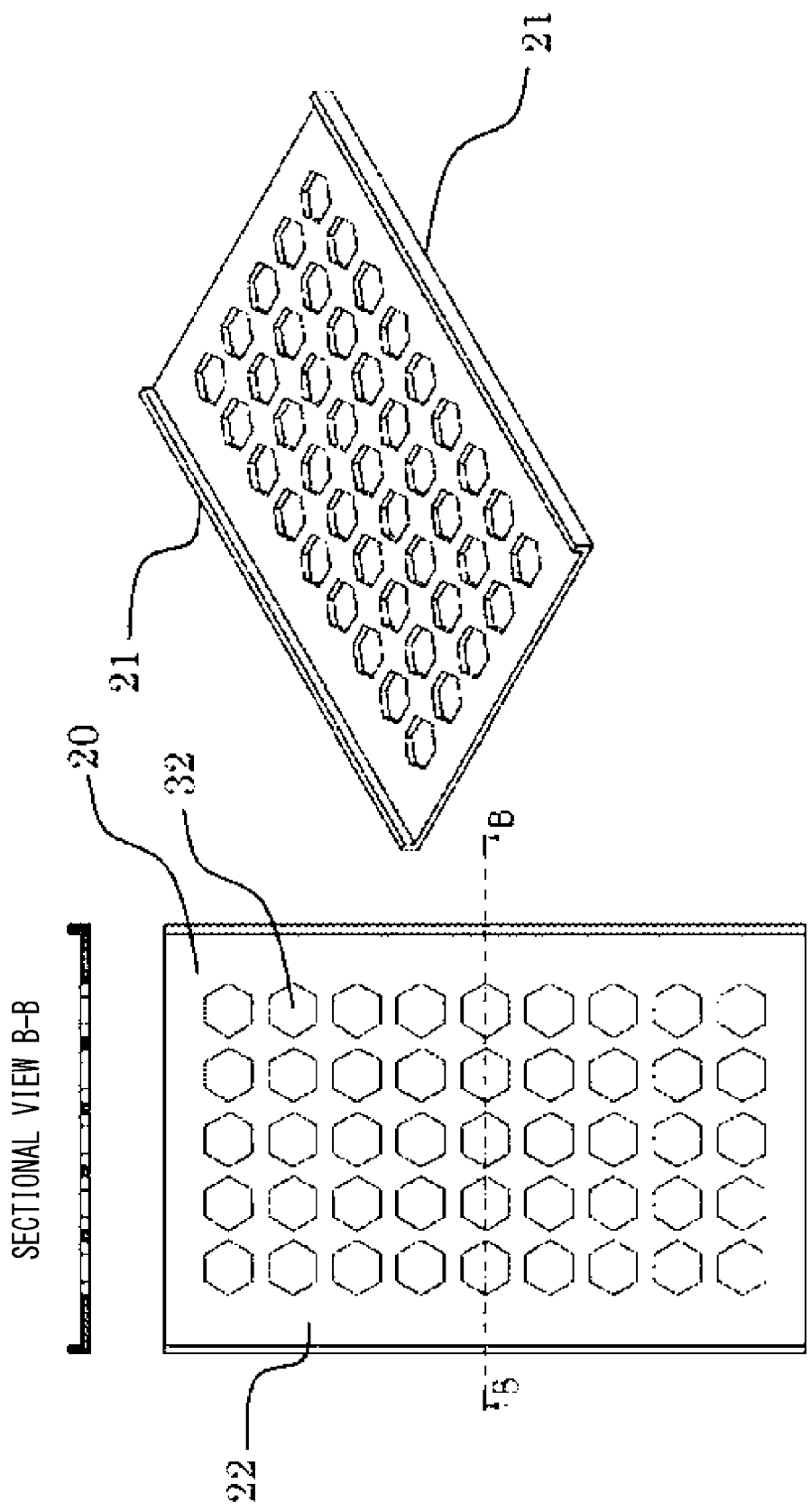
FIG. 7 is a perspective view and a sectional view illustrating a heat dissipation plate with hexagonal holes according to the first embodiment.
Figure 8:
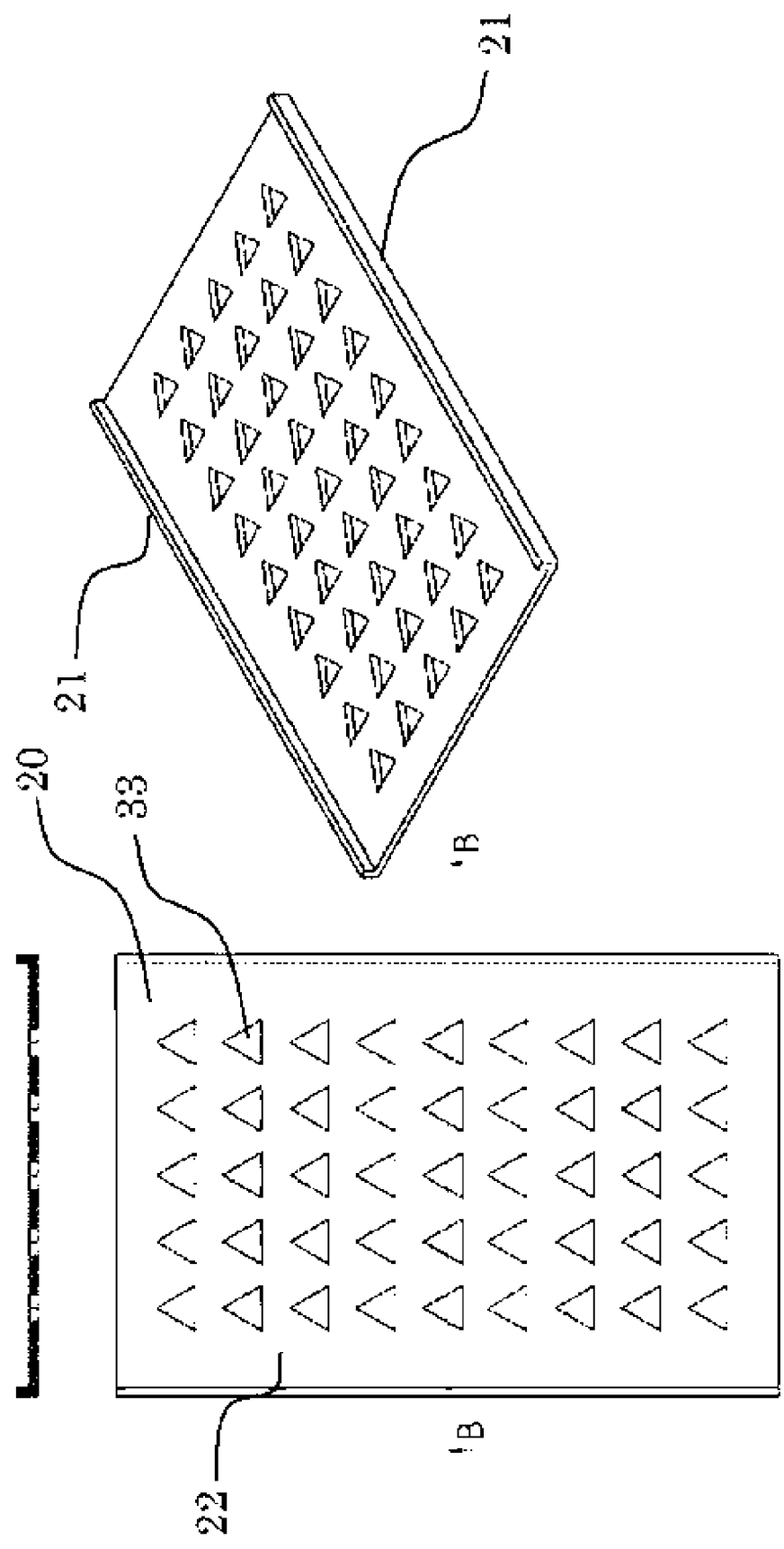
FIG. 8 is a perspective view and a sectional view illustrating a heat dissipation plate with triangular holes according to the first embodiment.
Figure 9:
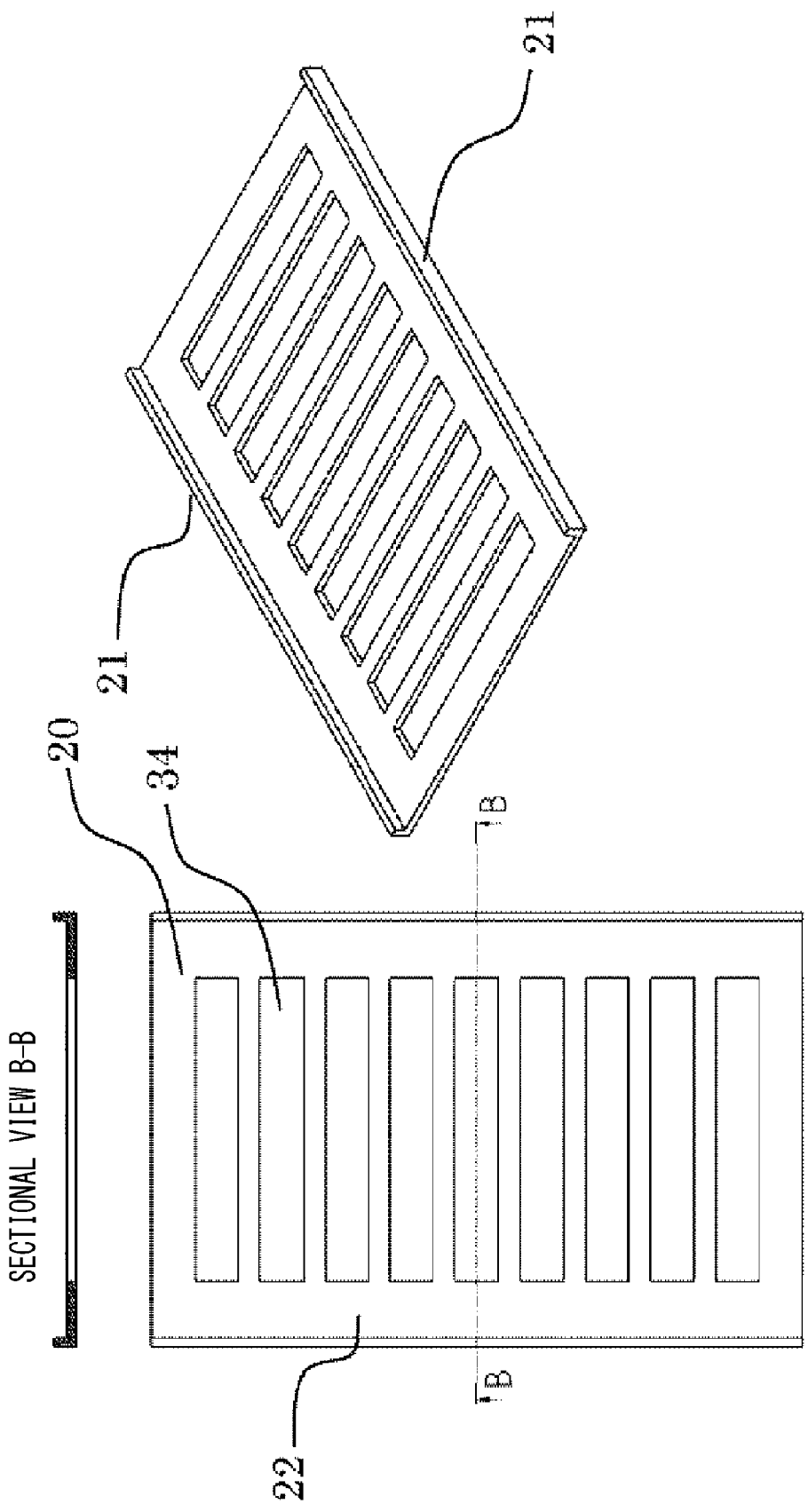
FIG. 9 is a perspective view and a sectional view illustrating a heat dissipation plate with slit-like holes according to the first embodiment.

The hole 30 in the heat dissipation plate 20 according to the embodiment has a circular shape as illustrated in FIGS. 3(a) and (b). However, the mesh shape of the hole in the heat dissipation plate 20 is not limited to the circular shape. The shape may be variously changed such as rectangular holes 31 as illustrated in FIG. 6, hexagonal holes 32 as illustrated in FIG. 7, and triangular holes 33 as illustrated in FIG. 8. The holes 30 are not limited to the mesh structure and may be slit-like holes 34 as illustrated in FIG. 9. Regardless of the shape, the holes 30, 31, 32, 33, and 34 can provide the equivalent effect as long as the provision of the holes can assure the same contact area between the unit cell 10 and the heat dissipation plate 20. The mesh shape and the arrangement are not limited to those described above and it is only required that the holes are provided and the contact area between the laminated type battery 10 and the heat dissipation plate 20 can be changed.

<<Examples>>

Next, for verifying the operation effect of the battery pack according to the embodiment, the two-dimensional non-steady heat conduction analysis was performed under the condition as below.

Eleven sheets of laminated type batteries with a rated capacity of approximately 10 Ah were stacked in the thickness direction, and twelve sheets of 0.3-mm-thick heat dissipation plates made of aluminum alloy were held between the laminated type batteries. The ends of the heat dissipation plate were folded by a width of 3 mm so that the ends were brought into close contact with the inner side surface of the case. At the both ends of the laminated type battery in the stacking direction, the foamed resin with a thickness of 3 mm and with substantially the same area as the wide surface of the laminated type battery was disposed as the heat insulating plate in contact with the heat dissipation plate and the case. These were housed in the 2-mm-thick case made of aluminum alloy. Discharging was conducted at 30A with an ambient temperature of 27° C. The temperature of the batteries at 1080 seconds from the start of the discharging was evaluated.

The constants of the materials for the heat dissipation plate, the heat insulating plate, and the case are defined as below. The thermal conductivity of the heat dissipation plate, the heat insulating plate, and the case is 236 W/m·K, 0.1 W/m·K, and 236 W/m·K, respectively. The specific heat thereof is 900 J/kg·K, 2000 J/kg·K, and 900 J/kg·K, respectively. The density thereof is 2700 kg/m^3, 85 kg/m^3, and 2700 kg/m^3, respectively. Since the laminated type battery has a structure in which the composite materials are stacked, the thermal conductivity is 1 W/m·K in the thickness direction (stacking direction) and 401 W/m·K in the width direction, the specific heat is 954 J/kg·K, and the density is 2000 kg/m^3 in consideration of the material constant of the materials and the amount thereof to be used. At the contact interface between the members, the contact thermal conductivity is 10^12 W/m·K.

Based on the above analysis condition, the temperature distribution in the center of the laminated type batteries is compared between the conventional structure (heat dissipation plates formed of the same material) and the structure according to the present invention. Here, the laminated type battery at the lowermost position in the stacking direction is given a battery number 1, and the numbers are given in the stacking order; the laminated type battery in the uppermost position is given a battery number 11.

In the structure according to the present invention used in the analysis, the heat dissipation plates in contact with the stacking surface of the laminated type batteries with battery numbers 1, 2, 10, and 11 have the mesh structure of which total hole area constitutes 88% of the contact area with the laminated type batteries.

The other heat dissipation plates are single plate without holes. FIG. 5 illustrates the distribution of the temperature difference in which the center temperature of the unit cell 11 is the reference value 0 relative to the two battery modules. Circular marks represent the data of the conventional product including holeless plates, and square marks represent the data of the present invention. The structure according to the present invention provides the effect of suppressing the change rate of the temperature difference in unit cells with battery numbers 3, 4, 5, 6, 7, 8, and 9 located in the center to approximately 20% as compared to the conventional product. Thus, the temperature increase in the end and the center can be suppressed, and the effect of the present invention has been clarified.

As described above, the embodiment can provide the battery module of which temperature can be homogenized regardless of the material.

(Second Embodiment)

Next, a second embodiment is described. This embodiment is different from the first embodiment in that the total area of the holes of the heat dissipation plates between the laminated type batteries 10 is changed. In the description of this embodiment, the same components as those of the first embodiment are denoted by the same numeral.

Figure 14:
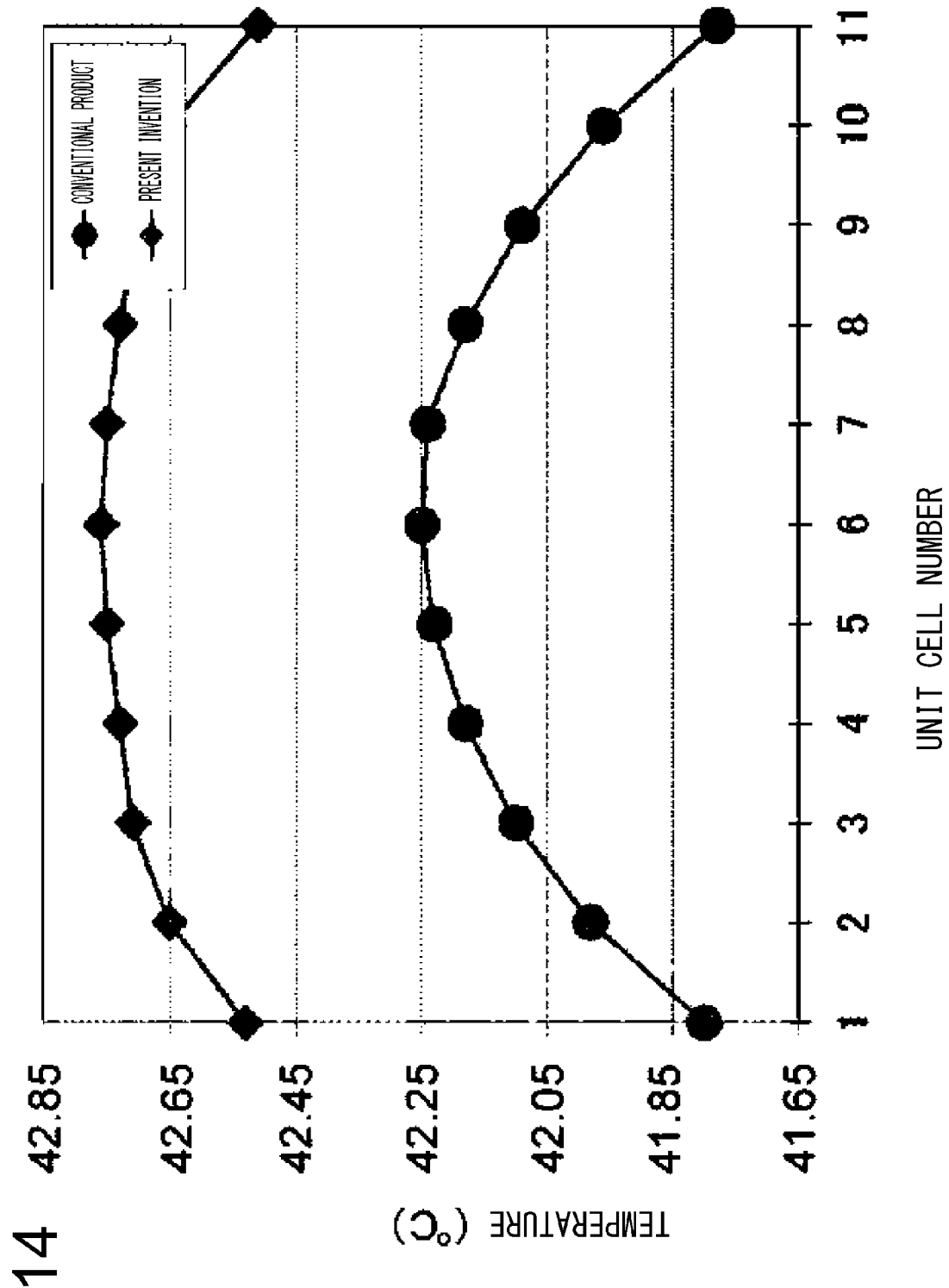
FIG. 14 illustrates the difference in absolute value of temperature between the conventional product and the first embodiment.

As compared to the case in which all the heat dissipation plates 20 do not have the holes, the temperature is increased by approximately 2 degrees when the heat dissipation plates according to the first embodiment are used (in which the total area of the holes 30 constitutes 88% of the area of the flat portion 22) as indicated in FIG. 14. That is to say, the temperature increase depends on the total area of the holes 30 provided for the heat dissipation plates 20. As compared with the case in which the heat dissipation plates without the holes are used, the overall temperature is increased in the battery module but if the temperature increase due to the heat generation in the discharging remains in the stable operation temperature range, it is preferable that the temperature is homogenized though the heat dissipation property is decreased as a whole. By homogenizing the temperature, the partial deterioration of the battery can be suppressed and the easily-controllable battery module can be provided.

Figure 13:
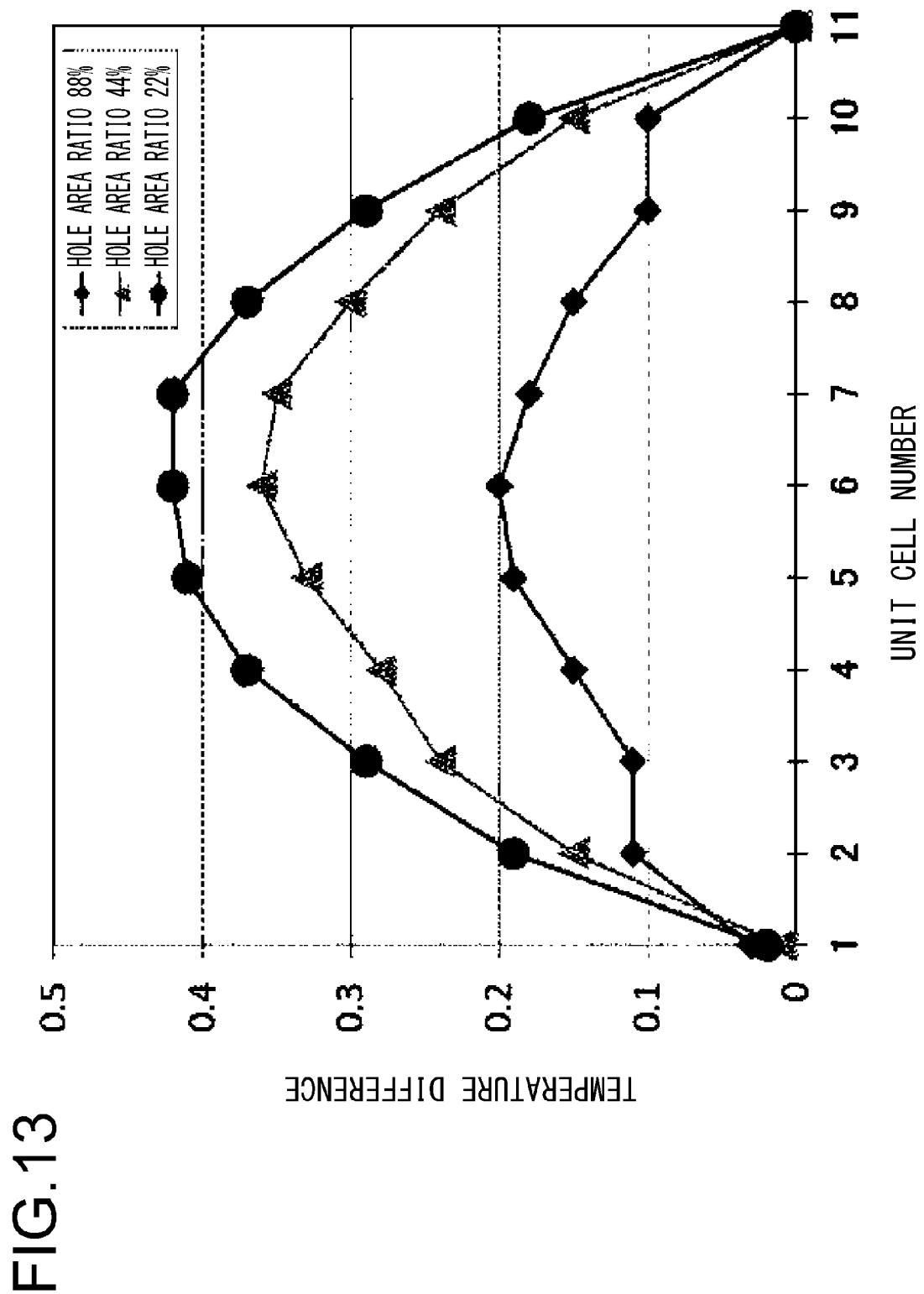
FIG. 13 illustrates results of analyzing the heat conduction of a laminated type battery group 110 if the total area of the holes is changed.

Therefore, in this embodiment, the total area of the holes 30 provided for the heat dissipation plates 20 is changed to 22% or 44% of the area of the flat portion 22. The temperature difference is increased when the total area of the holes is set to 22% of the area of the flat portion 22 as indicated in FIG. 13 but in this case, the temperature of the entire laminated type battery group 110 can be decreased accordingly.

(Third Embodiment)

Subsequently, a third embodiment is described. This embodiment is different from the first embodiment in that the total area of the holes of the heat dissipation plates disposed between the laminated type batteries 10 is changed gradually in the stacking direction of the laminated type batteries 10. In the description of this embodiment, the same components as those of the first embodiment are denoted by the same numeral.

In the conventional battery module structure, the temperature of the laminated type batteries 10 is increased in the quadratic manner from the end to the center in the stacking direction, and is the maximum in the unit cell 10 in the center (see the data of the conventional product in FIG. 5). Therefore, the temperature difference of the laminated type batteries 10 between in the end and in the center is increased as the number of the laminated type batteries 10 is increased. In this case, it is difficult to homogenize the temperature just by using the two kinds of heat dissipation plates 20 (the plate with the holes 30 and the plate without the holes) as described in the first embodiment.

In view of this, the heat dissipation plate 20 disposed on the outside in the stacking direction has the structure in which the contact area with the unit cell 10 is reduced and the contact area is increased gradually to the inside. In this manner, by stacking the heat dissipation plates 20 and the unit cells 10 so that the heat dissipation property is gradually increased from the outside to the inside in the stacking direction, the battery module capable of temperature homogenization regardless of the number of stacked layers can be provided.

The description is made more specifically. The heat dissipation plates described in the first embodiment includes three types: the first heat dissipation plate 20*a* and the second heat dissipation plate 20*f* disposed at the top surface and the bottom surface of the laminated type battery group 110, the third heat dissipation plates (20*c* and 20*d*) disposed in the center in the stacking direction of the laminated type battery group 110, and the fourth heat dissipation plates (20*b* and 20*e*) disposed between the first heat dissipation plate and the third heat dissipation plate and between the second heat dissipation plate and the third heat dissipation plate.

In the first embodiment, the first heat dissipation plate 20*a*, the second heat dissipation plate 20*f*, and the fourth heat dissipation plates 20*b* and 20*e* are the same but in this embodiment, the total area of the holes in the fourth heat dissipation plates 20*b* and 20*e* is smaller than the total area of the holes in the first heat dissipation plate 20*a* and the second heat dissipation plate 20*f*.

With the above structure, the temperature of the laminated type batteries can be homogenized while the increase in the overall temperature of the laminated type battery group 110 is suppressed.

(Fourth Embodiment)

Subsequently, a fourth embodiment is described. This embodiment is different from the first embodiment in that the heat dissipation plate 20 is formed by providing both surfaces of a flat plate 23 with a heat conductive material 60 formed of a material different from the flat plate 23, and that the heat conductive material 22 is provided with holes 35. In the description of this embodiment, the same components as those of the first embodiment are denoted by the same numeral.

Figure 10:
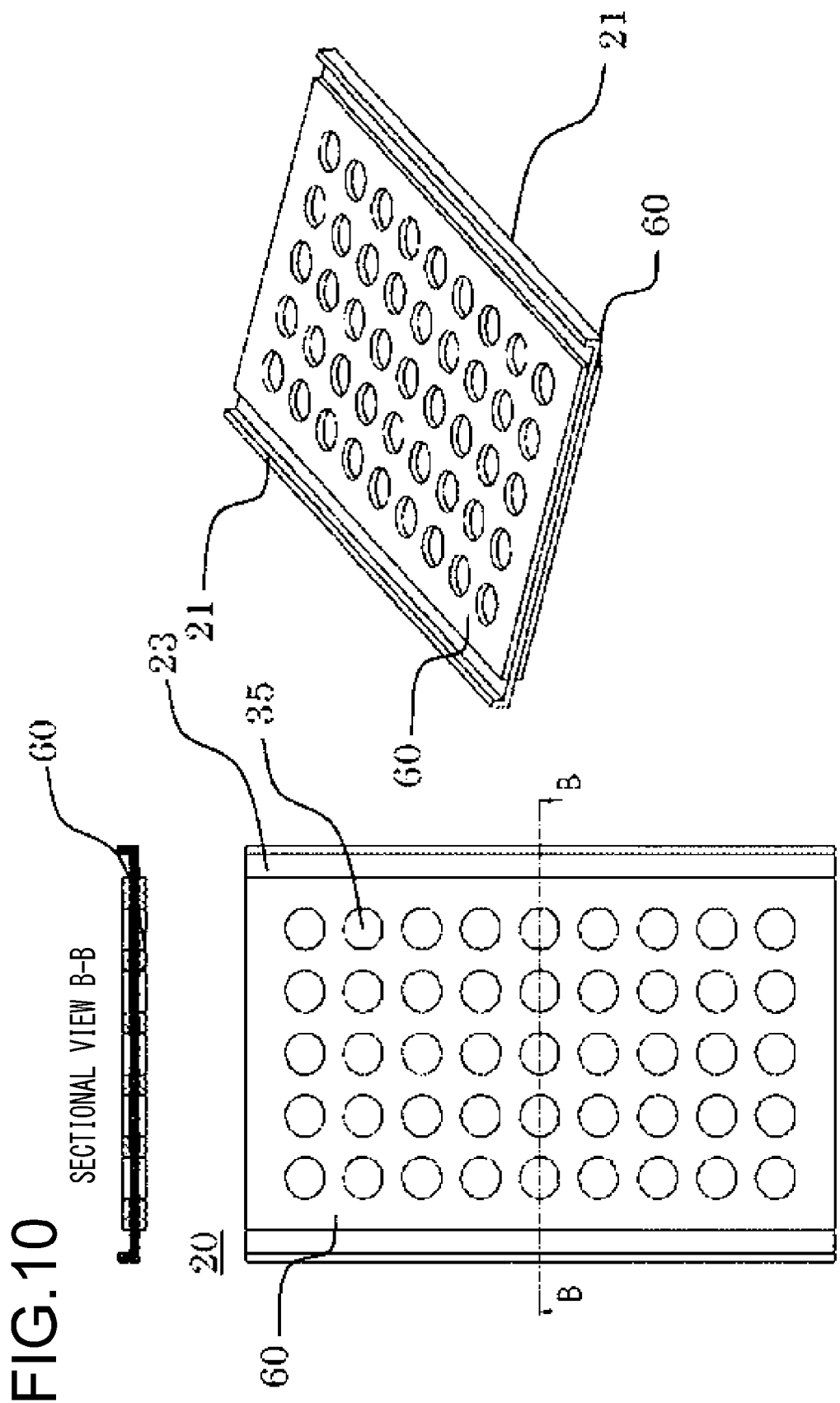
FIG. 10 is a perspective view and a sectional view illustrating a heat dissipation plate having a heat conduction material according to a fourth embodiment.

In the method of changing the contact area between the laminated type battery 10 and the heat dissipation plate 20, it is not always necessary that the heat dissipation plate 20 itself is provided with the holes 30. In this embodiment, as illustrated in FIG. 10, the heat conductive material 60 formed of the material different from the heat dissipation plate 20 is provided with the holes 35 and this mesh structure is provided on the surface of the holeless heat dissipation plate 20 in contact with the laminated type battery 10. Thus, by changing the contact area between the heat conductive material 60 and the laminated type battery 10 and the heat dissipation plate 20, the amount of heat flowing from the laminated type battery 10 to the heat dissipation plate 20 can be adjusted. Therefore, the cooling performance can be changed freely like in the example.

(Fifth Embodiment)

Subsequently, a fifth embodiment is described. This embodiment is different from the first embodiment in that the hole provided for the heat dissipation plate 20 is not the penetrating hole but is a bottomed hole 36. In the description of this embodiment, the same components as those of the first embodiment are denoted by the same numeral.

Figure 11:
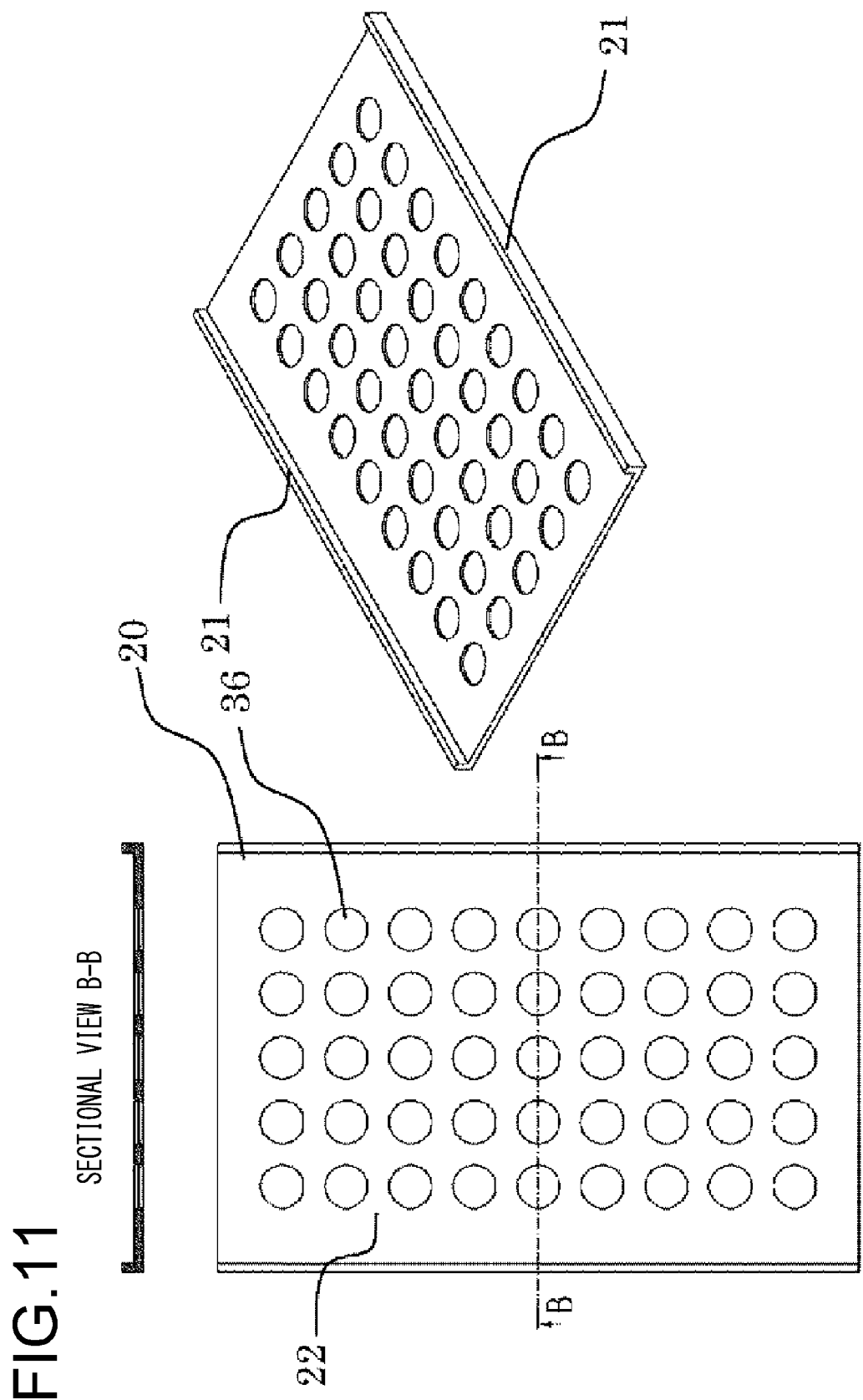
FIG. 11 is a perspective view and a sectional view illustrating a heat dissipation plate having depressions according to a fifth embodiment.

In this embodiment, the holes 36 provided for the flat portion 22 of the heat dissipation plate 20 are the bottomed holes 36, and the bottomed holes 36 are provided on the surface of the heat dissipation plate 20. FIG. 11 illustrates an example thereof. For the two surfaces of the heat dissipation plate 20 in contact with the laminated type battery 10, the heat dissipation plate 20 is pressed by the mold having the protrusions with the area equivalent to the holes 30 from both sides, so that the bottomed holes 36 are formed. Thus, the contact area between the laminated type battery 10 and the heat dissipation plate 20 can be reduced without the influence of burr in the mesh processing and the effect similar to the effect from the mesh structure can be obtained. With this structure, the heat capacity of the heat dissipation plate 20 does not need to be reduced as compared to the first embodiment where the heat dissipation plate 20 is provided with the penetrating holes, so that the heat dissipation effect higher than that in the first embodiment can be expected.

(Sixth Embodiment)

Next, a sixth embodiment is described. This embodiment is different from the first embodiment in that the area of the holes provided for the heat dissipation plate 20 is larger in a direction from the center of the heat dissipation plate 20 on the short side to the end thereof on the short side. In the description of this embodiment, the same components as those of the first embodiment are denoted by the same numeral.

As described above, the outside of the unit cell 10 held between the heat dissipation plates 20 in the contact direction between the heat dissipation plate 20 and the case 50, i.e., the heat dissipation portion, is cooled well but the inside thereof has the high temperature. The inhomogeneous temperature within the laminated type batteries 10 has an influence on the charging and discharging performance. In order to eliminate the influence, it is desired that the amount of flowing heat to be released is reduced on the outside in the contact direction between the heat dissipation plate 20 and the case 50 and the amount of flowing heat is increased on the inside.

Figure 12:
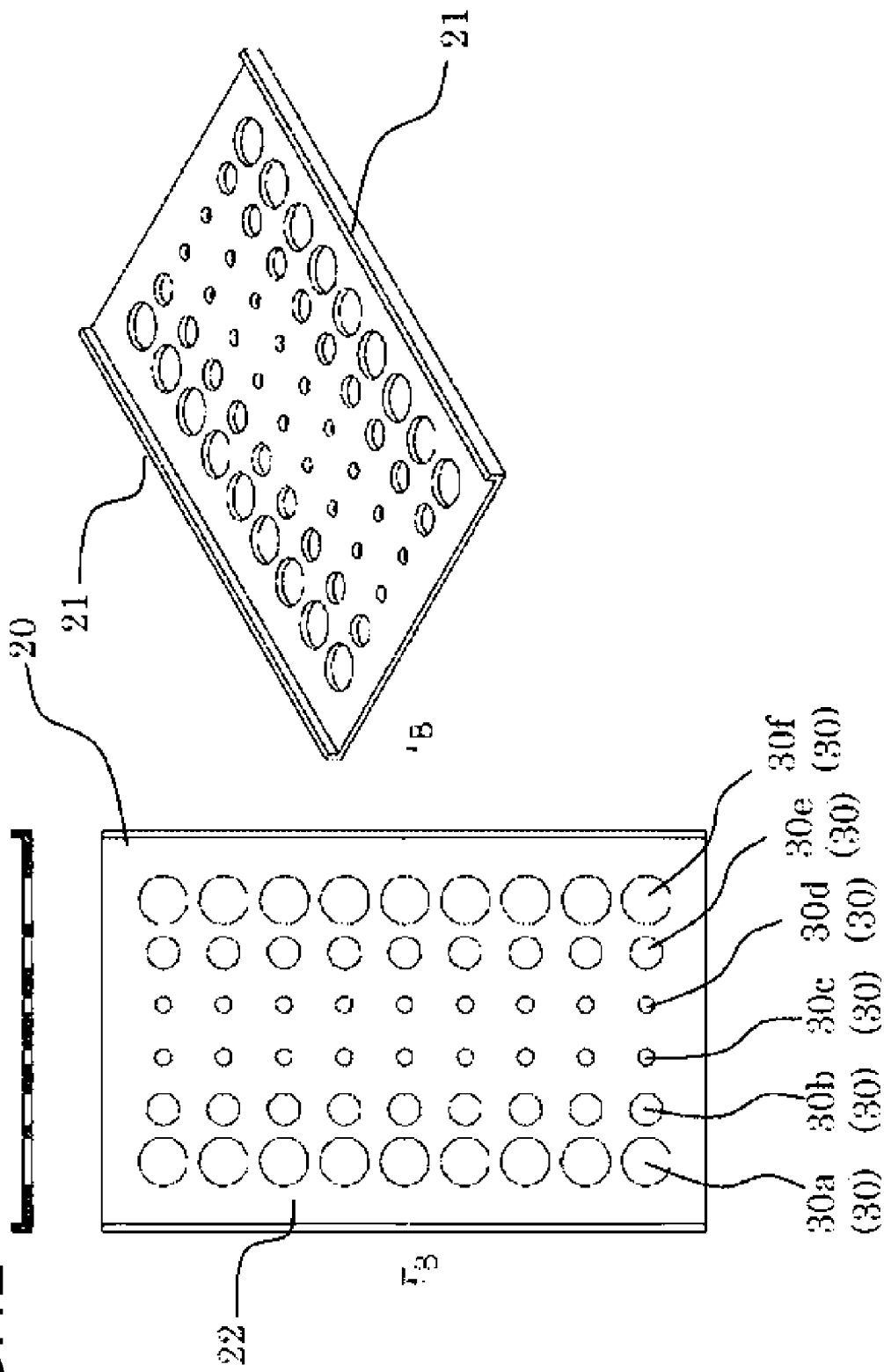
FIG. 12 is a perspective view and a sectional view illustrating a heat dissipation plate for homogenizing the temperature inside a unit cell according to a sixth embodiment.

In view of this, in this embodiment, the size of the holes 30 is changed in the flat portion 22 of the heat dissipation plate with short sides and long sides. FIG. 12 illustrates the mesh shape for homogenizing the internal temperature of the laminated type battery 10. In the contact surface between the heat dissipation plate 20 and the laminated type battery 10, the holes 30a and 30f on the outside in the contact direction between the heat dissipation plate 20 and the case 50 are enlarged and the holes 30b and 30e on the inside are narrowed. The holes 30c and 30d on the innermost side are minimized. That is to say, the holes 30 are enlarged in a direction from the center of the short side to the end of the short side in the flat portion 22. With this structure, the amount of flowing heat is increased inside the unit cell 10 because the contact area with the heat dissipation plate is increased, and the amount of flowing heat is decreased outside because the contact area with the heat dissipation plate is reduced. Thus, the temperature homogenization inside the unit cell 10 becomes possible.

The embodiments of the present invention have been described so far. However, the present invention is not limited by the embodiments and various design changes are possible without departing from the spirit of the present invention according to the scope of claims. For example, the embodiments are to describe the present invention specifically and are not intended to limit the subject matter described herein to the precise form disclosed. It is to be understood that a component in the structure of the embodiment can be replaced by another component in the structure of another embodiment and that the structure of the embodiment can be added to the structure of another embodiment. In the embodiment, a component of the structure can be added to, deleted from, or replaced by the other structure.

REFERENCE SIGNS LIST 10 laminated type battery
20 heat dissipation plate
30 hole
40 positive electrode terminal
41 negative electrode terminal
50 case
60 heat conductive material
70 heat insulating plate
100 battery module

The invention claimed is:

1. A battery module comprising:
   a first heat dissipation plate and a second heat dissipation plate;
   a laminated type battery group disposed between the first heat dissipation plate and the second heat dissipation plate and formed by stacking two or more laminated type batteries; and
   a case housing the laminated type battery group, and the first heat dissipation plate and the second heat dissipation plate, wherein:
   a third heat dissipation plate is disposed between the two or more laminated type batteries among the laminated type battery group;
   each of the first heat dissipation plate, the second heat dissipation plate, and the third heat dissipation plate includes a contact portion in contact with the case, and a flat portion in contact with and opposite to the laminated type battery; and
   the flat portion of the first heat dissipation plate and the flat portion of the second heat dissipation plate are provided with a plurality of holes;
   the number of laminated type batteries included in the laminated type battery group is four or more;
   the two or more laminated type batteries are disposed between the third heat dissipation plate and the first heat dissipation plate and between the third heat dissipation plate and the second heat dissipation plate;
   a fourth heat dissipation plate is disposed each between the two or more laminated type batteries disposed between the third heat dissipation plate and the first heat dissipation plate and between the two or more laminated type batteries disposed between the third heat dissipation plate and the second heat dissipation plate;
   the fourth heat dissipation plate includes a contact portion in contact with the case, and a flat portion in contact with and opposite to the laminated type battery;
   the flat portion of the fourth heat dissipation plate is provided with a plurality of holes,
   a total area of the holes provided for the flat portion of the first heat dissipation plate is larger than a total area of the holes provided for the flat portion of the fourth heat dissipation plate;
   a total area of the holes provided for the flat portion of the second heat dissipation plate is larger than a total area of the holes provided for the flat portion of the fourth heat dissipation plate,
   the flat portion of the third heat dissipation plate is provided with a plurality of holes; and
   the total area of the holes provided for the flat portion of the fourth heat dissipation plate is larger than a total area of the holes provided for the flat portion of the third heat dissipation plate.

2. The battery module according to claim 1, wherein:
   each of the first heat dissipation plate and the second heat dissipation plate is formed of a flat plate material and a heat conduction plate;
   the heat conduction plate is formed of a material different from the flat plate material; and the heat conduction plate is provided with a plurality of holes.

3. The battery module according to claim 1, wherein the plurality of holes provided for the fourth heat dissipation plate is bottomed holes.

4. The battery module according to claim 1, wherein:
each of the flat portion of the first heat dissipation plate and the flat portion of the second heat dissipation plate has a rectangular shape with a short side and a long side; and
the plurality of holes provided for the flat portion of the first heat dissipation plate and the plurality of holes provided for the flat portion of the second heat dissipation plate have larger area in a direction from a center of the short side to an end of the short side.

5. The battery module according to claim 1, wherein:
the flat portion of the first heat dissipation plate is in contact with the case through a first heat insulating material; and
the flat portion of the second heat dissipation plate is in contact with the case through a second heat insulating material.

* * * * *